(No Model.)

F. C. ROBINSON.
MULTIPLE GEARING.

No. 531,220. Patented Dec. 18, 1894.

Witnesses

Inventor
Fredrick C. Robinson.
By his Attorneys.
C. A. Snow & Co.

UNITED STATES PATENT OFFICE.

FREDRICK C. ROBINSON, OF EAST FREMONT, MICHIGAN.

MULTIPLE GEARING.

SPECIFICATION forming part of Letters Patent No. 531,220, dated December 18, 1894.

Application filed July 14, 1894. Serial No. 517,543. (No model.)

*To all whom it may concern:*

Be it known that I, FREDRICK C. ROBINSON, a citizen of the United States, residing at East Fremont, in the county of Sanilac and State of Michigan, have invented a new and useful Multiple Gearing, of which the following is a specification.

My invention relates to multiple gearing for bicycles, tricycles, and similar vehicles, and it has for its object to provide simple, inexpensive, and efficient means for adjusting the gearing of machines of the class mentioned to secure either power or speed, such means of adjustment being positive and not liable to disarrangement or displacement through accident.

Further objects and advantages of the invention will appear in the following description, and the novel features thereof will be particularly pointed out in the appended claim.

Figure 1:
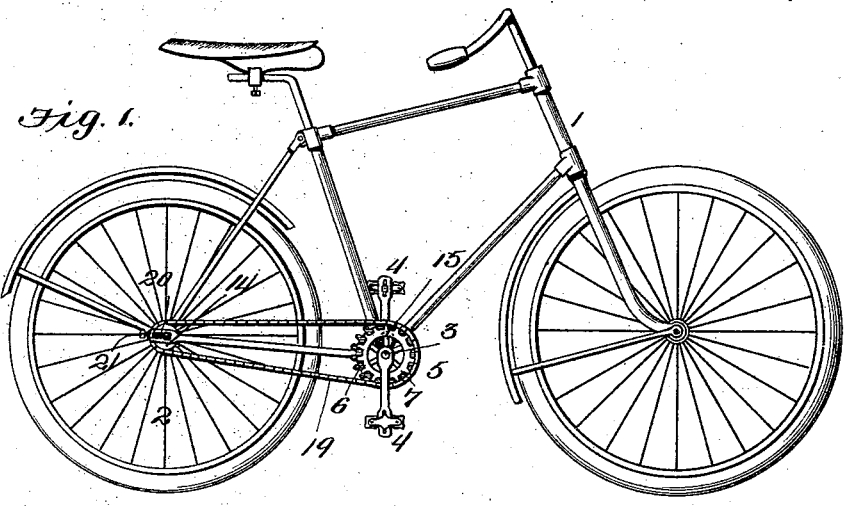
Figures 2, 3, 4:
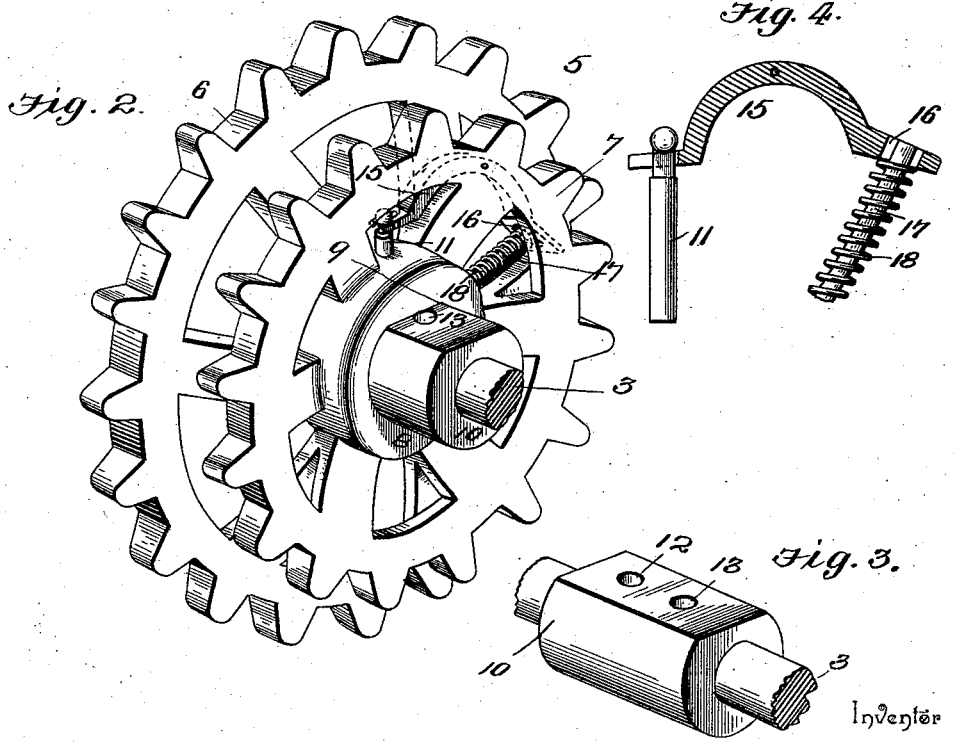

In the drawings: Figure 1 is a side view of a bicycle provided with a multiple gearing constructed in accordance with my invention. Fig. 2 is a detail view, in perspective, of the double gear forming a part of my invention. Fig. 3 is a detail view of a portion of the crank-shaft, showing the enlargement thereof. Fig. 4 is a detail view, partly in section, of the means for locking the double gear to the crank-shaft.

Similar numerals of reference indicate corresponding parts in all the figures of the drawings.

1 designates the frame of a bicycle of the ordinary or any preferred construction, and 2 the rear or driving wheel, 3 being the crank shaft to the extremities of which are attached the cranks 4. The double gear-wheel 5, consisting of the large gear 6 and the small gear 7, have a common hub 8 which is provided with an irregular bore 9 to receive the enlarged and irregular portion of the crank-shaft, said enlarged portion of the crank-shaft being indicated at 10, and in the construction illustrated being round with the exception of one side which is flattened. The double-gear-wheel is slidably fitted upon this enlarged portion of the crank-shaft and carries a locking-bolt 11 to engage one of the sockets 12 and 13 which are formed in the enlargement. When the locking-bolt is in engagement with the socket 13 the large gear is in alignment with the rear chain-wheel 14 which is attached to the driving-wheel, and when the bolt is in engagement with the socket 12 the small gear is in alignment with said chain-wheel. Connected, pivotally, to the locking-bolt is an operating lever 15 having an opening 16 at or near its free end which receives and slides upon the segmental guide 17, and coiled upon this guide, and bearing against the operating lever to normally hold the bolt in its operative or locking position is an actuating-spring 18, whereby accidental disengagement is prevented. The lever 15 is pivoted at an intermediate point to the small gear, and may be depressed at one end against the tension of the spring 18 to raise the other end and disengage the locking pin 11 from the socket in the shaft.

In the construction illustrated in the drawings the gear wheels 6 and 7 are shown as sprocket or chain-wheels, to mesh with the chain 19, and therefore it will be seen that when the wheel 6 is in alignment with the chain wheel on the driving-wheel and the chain is engaged therewith the machine is geared for speed, and when the wheel 7 is in alignment with said chain-wheel and the chain is engaged therewith the machine is geared for power. The difference in the length of the chain, when engaged with the different members of the double gear, is compensated for by the forward and rearward adjustment of the rear chain-wheel, the axle of the driving-wheel being fitted in slots 20 in the framework as in the ordinary construction, and an adjusting screw 21 being arranged to change the adjustment.

The operation of the improved gearing will be readily understood from the foregoing description, as well as the positiveness of the adjustment, whereby displacement of the parts is prevented, and it will be obvious that various changes in the form, proportion, and minor details of construction may be resorted to without departing from the spirit or sacrificing any of the advantages of the invention.

Having thus described my invention, I claim—

In a bicycle, the combination with a framework, a driving-wheel axle fitted in seats in the framework, means for adjusting the axle in a horizontal plane, a driving-wheel mounted upon said axle, and a chain-wheel carried by the driving-wheel, of a crank-shaft provided with a cylindrical enlargement or boss 10 having a flattened side in which are formed duplicate spaced sockets 12 and 13, a double-gear having a common hub fitted upon the enlargement of the crank-shaft and provided at one side of its bore with a flat surface to correspond with the similar surface on said enlargement, a chain connecting one of the members of the double gear with the chain wheel on the driving-wheel, a locking pin fitting in a radial opening in the hub of the double-gear and adapted to engage one of the sockets in the enlargement of the crank-shaft to secure either member of the double-gear in the plane of the chain-wheel on the driving-wheel, a pivotal lever arranged between the members of the double-gear and connected to said locking pin, and a spring for holding the lever in its normal position, said lever being provided at its free end with a guide opening fitted upon a guide pin fixed to the hub of the double-gear, and said spring being coiled upon the guide pin, substantially as specified.

In testimony that I claim the foregoing as my own I have hereto affixed my signature in the presence of two witnesses.

FREDRICK C. ROBINSON.

Witnesses:
W. R. McCREDIE,
FRED. H. FILWOCK.